United States Patent
Lee et al.

(10) Patent No.: US 7,599,330 B2
(45) Date of Patent: Oct. 6, 2009

(54) HANDOVER METHOD IN WLAN AND MOBILE NODE DEVICE PERFORMING HANDOVER IN WLAN

(75) Inventors: Jae-hwang Lee, Seoul (KR); Pyung-soo Kim, Seoul (KR); Hak-goo Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 792 days.

(21) Appl. No.: 10/771,508

(22) Filed: Feb. 5, 2004

(65) Prior Publication Data

US 2004/0253954 A1 Dec. 16, 2004

(30) Foreign Application Priority Data

Feb. 5, 2003 (KR) .................. 10-2003-0007117

(51) Int. Cl.
*H04W 4/00* (2009.01)
*H04W 36/00* (2009.01)
(52) U.S. Cl. .................. 370/331; 370/338; 455/436
(58) Field of Classification Search .............. 370/331, 370/338, 395.53, 332, 333, 334, 349, 392; 455/436, 439, 437, 438, 440, 441, 442, 443, 455/444

See application file for complete search history.

(56) References Cited

U.S. PATENT DOCUMENTS

| 6,473,413 B1 | 10/2002 | Chiou et al. |
| 6,832,087 B2 * | 12/2004 | Gwon et al. ............... 455/436 |
| 2002/0131386 A1 * | 9/2002 | Gwon ....................... 370/338 |

FOREIGN PATENT DOCUMENTS

| KR | 1998-061781 A | 10/1998 |
| KR | 2001-87890 A | 3/2002 |

\* cited by examiner

*Primary Examiner*—Eugene Yun
(74) *Attorney, Agent, or Firm*—Sughrue Mion, PLLC (57) ABSTRACT

A handover method in a wireless local area network (WLAN) environment, a mobile node device that carries out a handover in a WLAN environment, and a beacon signal structure are provided. The handover method involves receiving a beacon signal containing access router identification information; and carrying out a handover based on the access router identification information contained in the beacon signal. The mobile node device includes a beacon signal reception unit for receiving a beacon signal containing access router identified information, a determination unit for comparing access router identification information from the beacon signal with that of a previous access router and a handover performing unit for carrying out a handover based on a result of the determination from the determination unit. The beacon signal structure, which is used for carrying out a handover in a WLAN environment, includes a reserved field into which access router identification information is inserted.

8 Claims, 8 Drawing Sheets

HANDOVER METHOD IN WLAN AND MOBILE NODE DEVICE PERFORMING HANDOVER IN WLAN

BACKGROUND OF THE INVENTION

This application claims the priority of Korean Patent Application No. 2003-7117, filed on Feb. 5, 2003, in the Korean Intellectual Property Office, the disclosure of which is incorporated herein in its entirety by reference.

1. Field of the Invention

Methods and apparatuses consistent with the present invention relate to a handover method in a wireless local area network (WLAN) and a mobile node device that carries out a handover in a WLAN.

2. Description of the Related Art

The Internet has become one of the most important information infrastructures. While the number of Internet users and the amount of Internet equipment has rapidly increased, several problems, such as IP address shortages, low routing efficiency, low mobility, and low quality-of-service (QoS), have appeared. To address these problems, Internet Protocol version 6 (IPv6) has been developed and is now expected to be commercialized.

In addition, mobile IPv6, which can more reliably and more efficiently guarantee mobility while providing typical IPv6 functions, has been developed. However, in order to enable seamless mobile communications, a handover process on Layer 3 (IP layer) is essential.

Recently, an Internet draft (IETF:draft-ietf-mobileip-fast-mipv6-0.5.txt) entitled "Fast Handovers for Mobile IPv6" has been suggested. The Internet draft presents an algorithm capable of carrying out a quick handover with the help of Layer 2 (link layer).

In the meantime, handovers in Layer 3, which is an IP layer, are essential for seamless mobile communications. So far, various algorithms for carrying out fast handover by taking advantage of Layer 2 (i.e., link layer) have been suggested.

Figure 1:
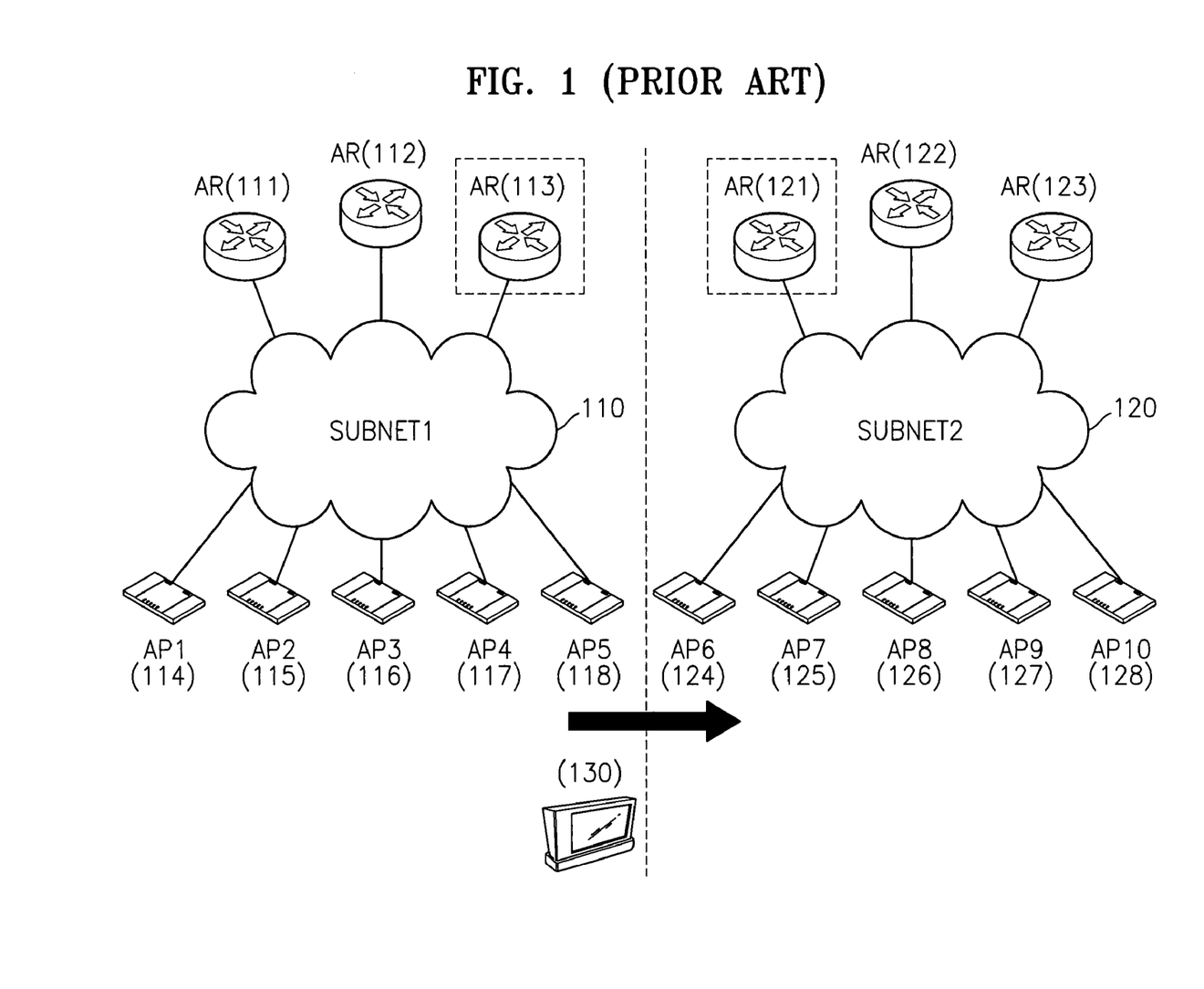
FIG. 1 is a diagram illustrating a conventional 802.11 deployment in which relay access points (APs) are provided.

FIG. 1 illustrates a network system on a 802.11 WLAN having relay access points (AP). Referring to FIG. 1, the network system includes subnet 1 (110) connecting access routers (AR) 111 through 113 and APs 114 through 118 and subnet 2 (120) connecting ARs 121 through 123 and APs 124 through 128.

A subnet is a layer 3 network with a single shared prefix, and a network adopting a plurality of relay APs based on a WLAN is a layer 2 network.

A mobile node 130 carries out a handover with a plurality of APs while moving from place to place. In a case where the mobile node 130 moves between APs in the same subnet, an L3 (i.e., layer 3) handover is not carried out. On the other hand, in a case where the mobile node 130 moves from an AP in one subnet to an AP in another subnet, an L2 (i.e., layer 2) trigger occurs. Accordingly, the L3 handover is carried out together with an L2 handover.

Figure 2:
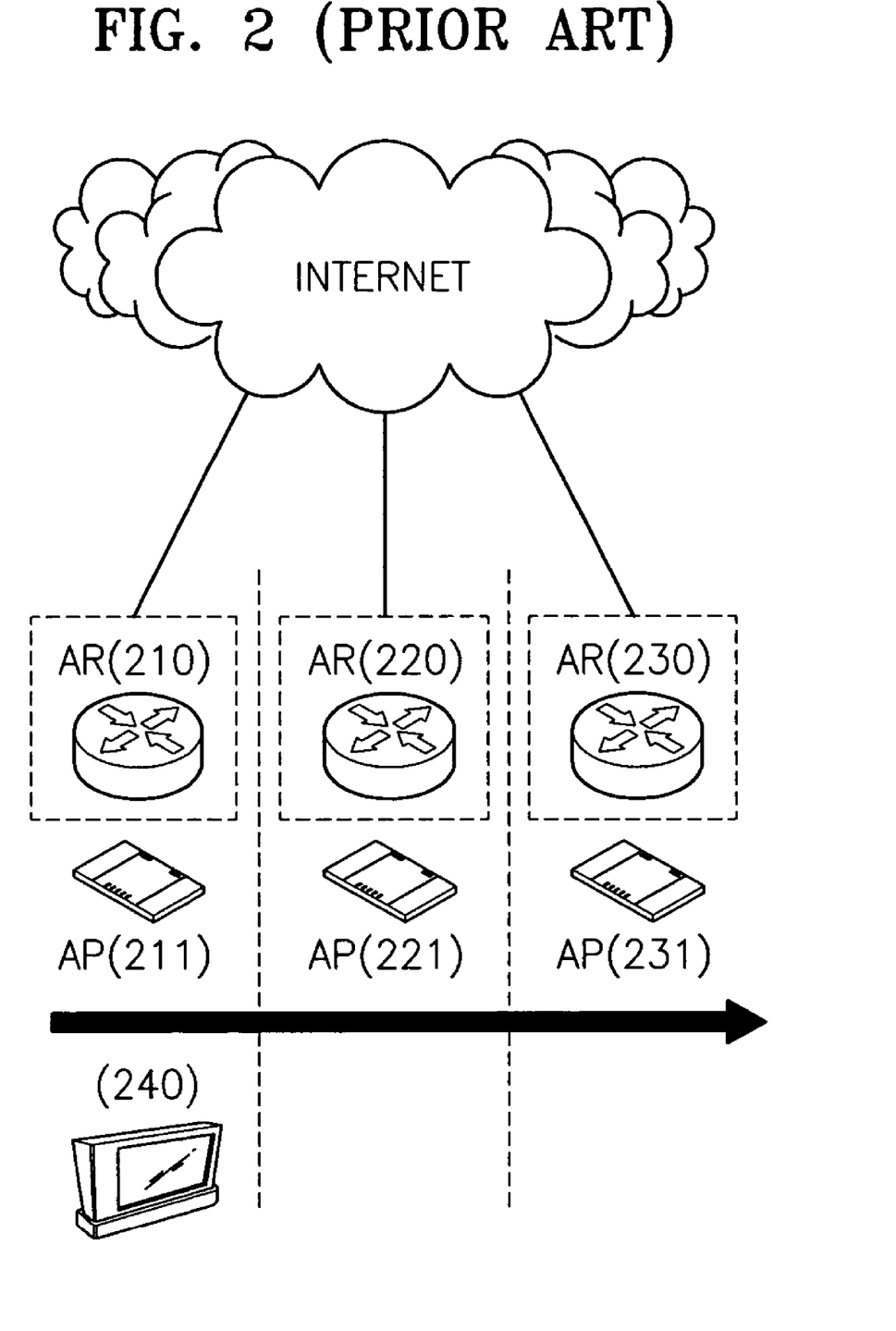
FIG. 2 is a diagram illustrating a conventional 802.11 deployment in which integrated APs/access routers (ARs) are provided.

FIG. 2 illustrates a network system on a 802.11 WLAN including integrated APs/ARs.

Referring to FIG. 2, the network system is based on a single subnet, i.e., a network with a single shared prefix, in which a single AP using a WLAN is used. Accordingly, one AR exists for an AP. Therefore, if a mobile node 240 meets a new AP while moving from place to place, an L2 trigger occurs, and thus an L3 handover is carried out together with an L2 handover.

Figure 3:
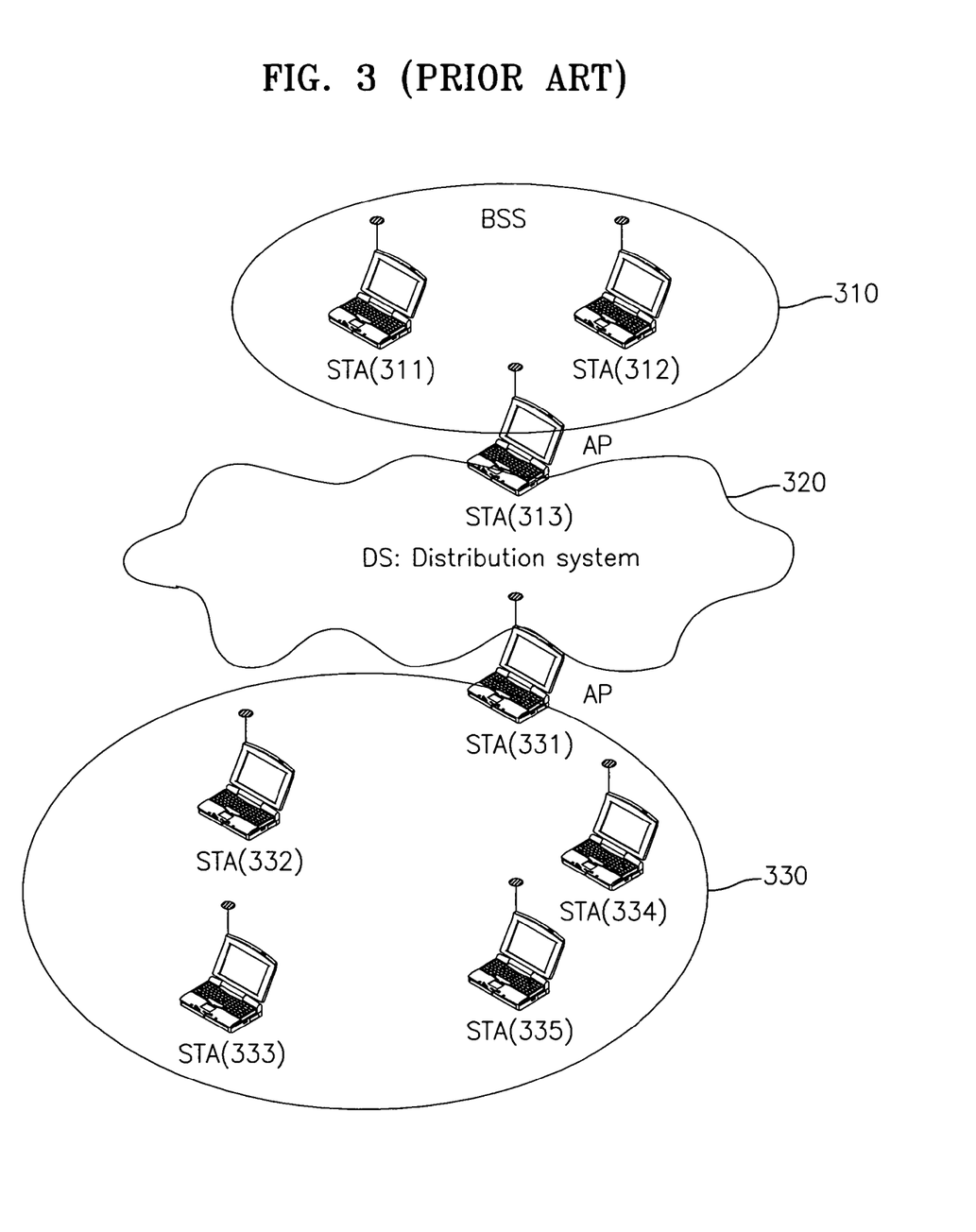
FIG. 3 is a diagram illustrating an example of a conventional 802.11 deployment.

FIG. 3 illustrates an example of a 802.11 WLAN system. Referring to FIG. 3, a basic service set (BSS) 310 constituted by an AP 313 and clients 311 and 312, and a BSS 330 constituted by an AP 331 and clients 332, 333, 334 and 335, are connected to a distribution system (DS) 320.

Figure 4:
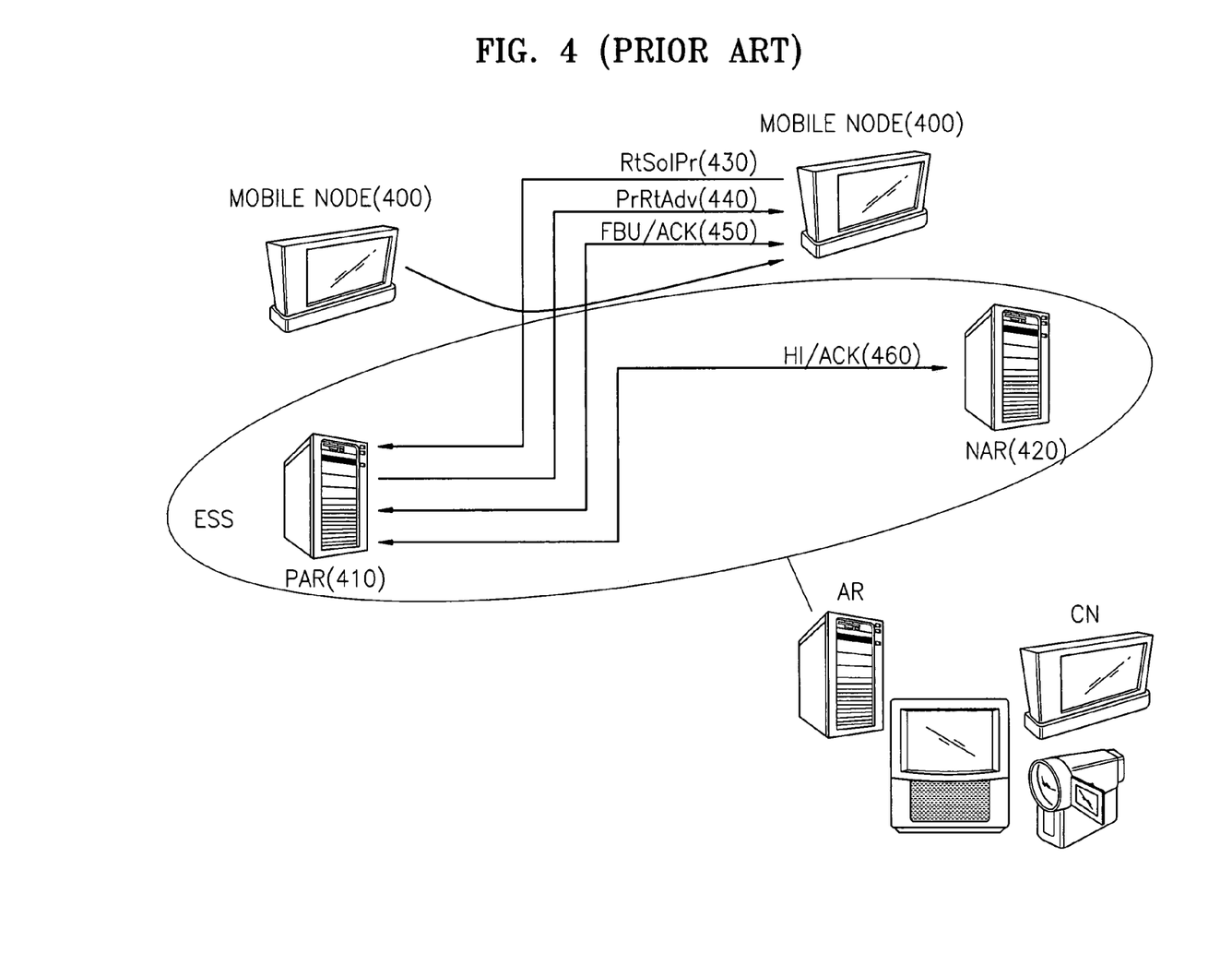
FIG. 4 is a diagram illustrating a conventional fast handover method in mobile IPv6.

A conventional handover method is illustrated in FIG. 4.

When an L2 trigger occurs, a mobile node 400 recognizes that it has just entered a new network. In addition, the mobile node 400 can identify BSS identification (ID) of a new access router (NAR) 420.

Then, the mobile node 400 issues a request for information on the NAR 420 corresponding to the identified BSSID to a previous access router (PAR) 410 by sending an RtSolPr message 430 to the PAR 410.

The PAR 410 searches its distributed service table (DST) for the requested information, for example, prefix information, a link layer address, and an IP address of the NAR 420, and returns the information to the mobile node 400 by sending a PrRtAdv message 440 to the mobile node 400.

The mobile node 400 creates a care-of-address (CoA) using its own media access control (MAC) address and the prefix information of the NAR 420, received from the PAR 410, and transmits a fast binding update (FBU) message 450 to the PAR 410.

The PAR 410 responds to the reception of the FBU message 450 by transmitting an acknowledgement (ACK) message 450 to the mobile node 400.

Thereafter, the PAR 410 transmits a handover initiation (HI) message 460 to the NAR 420, and the NAR 420 transmits an ACK message 160 to the PAR 410 in response to the reception of the HI message 460, thus completing an entire handover process.

If there are packets to be transmitted from the PAR 410 to the mobile node 420 during the handover process, the packets are transmitted to the mobile node 420 via the NAR 420. After the handover process, the mobile node 400 uses the NAR 420.

FIG. 4 illustrates a fast handover process carried out in the network structure shown in FIG. 2. However, an IPv6 network is generally constituted by subnets in each of which a plurality of APs and a plurality of ARs, rather than a single AP, are provided, like the subnets shown in FIG. 1.

In the network of FIG. 1, if the mobile node 130 changes access routers through L2 handover, a process of checking whether or not a NAR belongs to the same subnet that a PAR belongs to is necessary. In the prior art, there are two different types of methods of handing over a mobile node between APs, which will be described in the following paragraphs.

First, in the case of handing over a mobile node between APs in the same subnet, the mobile node is required to communicate with an AR, i.e., an L3 layer, in order to check which subnet a PAR and a NAR belong to. In the case of handing over a mobile node between APs in different subnets, the mobile node is also required to communicate with the AR in order to check whether or not the NAR belongs to the same subnet that the PAR belongs to, and then a fast handover process is carried out, as shown in FIG. 4.

Therefore, when a mobile node changes access routers, there is a need to check whether or not a NAR belongs to the same subnet that the PAR belongs to, which may cause handover latency. Here, handover latency indicates a period of time during which the mobile node is unable to receive or transmit packets over an IP layer due to a handover process.

In the meantime, Korean Patent Laid-open Publication No. 10-2002-0023918 entitled "Fast Hand-Off Method Using Beacon Message Based On Wireless LAN" discloses a handover technique in which an access router, to which a mobile node is to be handed over, periodically sends out a beacon message containing power intensity measurement information and prefix information and a user terminal that receives the beacon message creates an address using the prefix information and carries out a handover operation using the created address. In this technique, an NAR's prefix information is contained in a beacon message, and then the beacon message is transmitted to a user terminal. Therefore, the beacon message needs to be large enough to contain the NAR's prefix information. However, a beacon message, which is large enough to contain prefix information, is hardly compatible with a conventional network system.

SUMMARY OF THE INVENTION

The present invention provides a handover method in a wireless local area network (WLAN), a mobile node device that carries out handover in a WLAN, and a beacon signal structure.

According to an aspect of the present invention, there is provided a handover method in a wireless local area network (WLAN) environment. The handover method involves a) receiving a beacon signal containing access router identification information; and b) carrying out a handover based on the access router identification information contained in the beacon signal.

According to another aspect of the present invention, there is provided a mobile node device that carries out handover in a WLAN environment. The mobile node device includes a beacon signal reception unit, which receives a beacon signal containing access router identification information, a determination unit, which compares the access router identification information contained in the beacon signal with a previous access router's access router identification information, and a handover performing unit, which carries out a handover differently depending on whether or not a currently servicing access router is the same as the previous access router by referring to a result of the determination provided by the determination unit.

According to still another aspect of the present invention, there is provided a beacon signal structure, which is used for carrying out a handover in a WLAN environment. A reserved field of the beacon signal includes a capability information field into which access router identification information is inserted.

According to the present invention, it is possible to reduce handover latency in a layer 3 handover, by inserting AR identification (ID) information into a specific field of a beacon signal transmitted from an AP to a mobile node during a layer 2 handover carried out between APs in a WLAN whose subnets respectively include a plurality of APs.

In addition, according to the present invention, there is no need for an AP and an AR to transmit messages in order to check whether or not a NAR belongs to the same subnet that a PAR belongs, when a handover is carried out between APs in the same subnet.

BRIEF DESCRIPTION OF THE DRAWINGS

The above and other illustrative features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings in which exemplary embodiments of the invention are shown.

Figure 5:
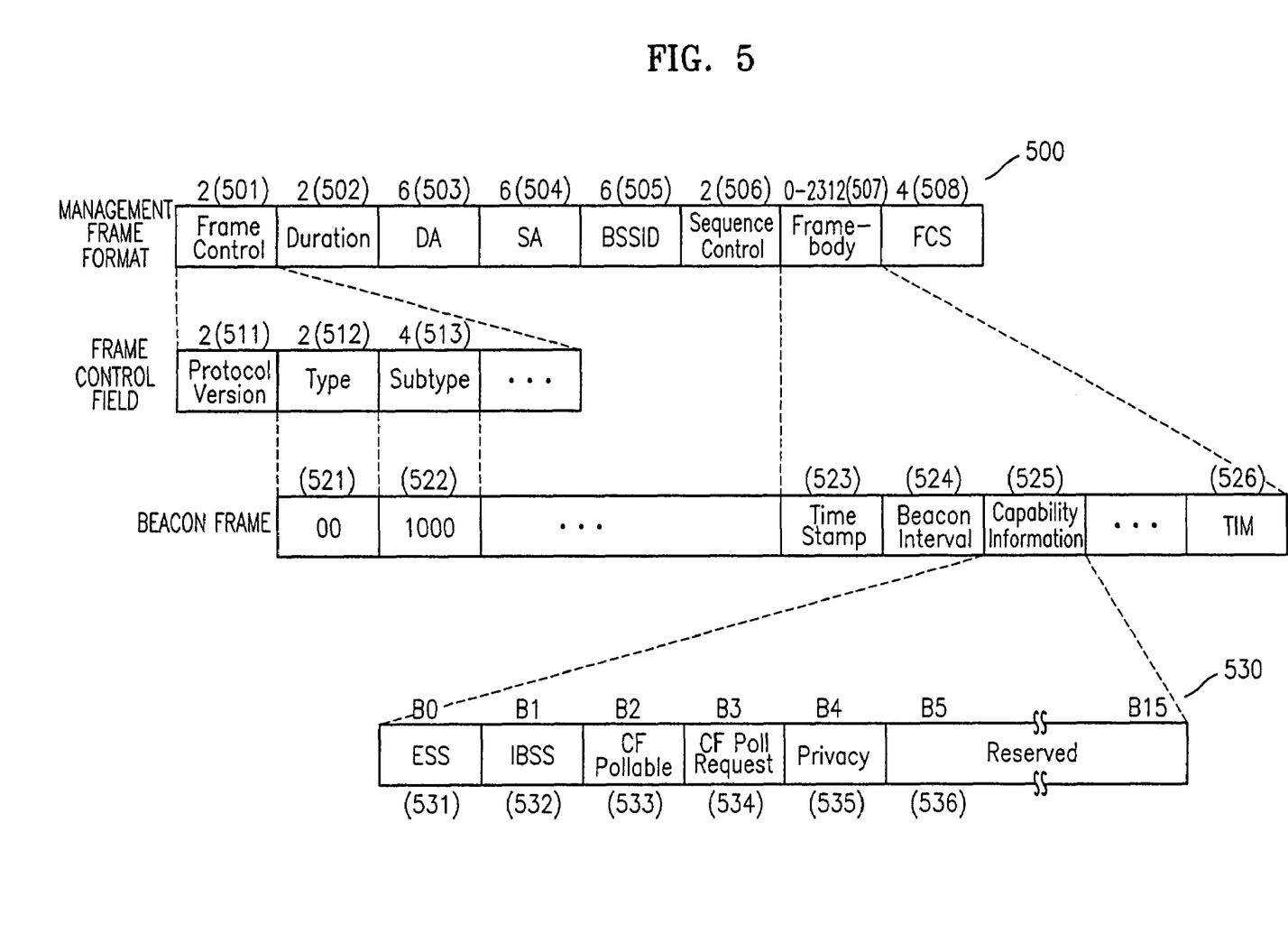
FIG. 5 is a diagram illustrating the format of a 802.11 media access control (MAC) management frame.

FIG. 5 is a diagram illustrating the format of a 802.11 media access control (MAC) management frame. Referring to FIG. 5, a management frame 500 includes a frame control field (Frame Control) 501, a duration field (Duration) 502, a destination address field (DA) 503, a source address field (SA) field 504, a basic service set identification field (BSSID) 505, a sequence control field (Sequence Control) 506, a frame body 507, and a frame check sequence field (FCS) 508.

The frame control field 501 includes a protocol version field (Protocol Version) 511, a type field (Type) 512, and a subtype field (Subtype) 513.

The type field 512 and the subtype field 513 define various types of frames. For example, a beacon frame 520 has a type field value of 00 (521) and a subtype field value of 1000 (522). The frame body 507 includes a time stamp field (Time Stamp) 523, a beacon interval field (Beacon Interval) 524, a capability information field (Capability Information) 525, and a traffic indication map field (TIM) 526.

The capability information field 525 includes an extended service set field (ESS) field 531, an independent basic service set field (IBSS) 532, a contention-free pollable field (CF Pollable) 533, a contention-free poll request field (CF Poll Request) 534, a privacy field (Privacy) 535, and a reserved field (Reserved) 536.

Each of the frames constituting the management frame 500 has already been defined by the IEEE 802.11 Standard, and thus its description will not be presented here. In this disclosure, an explanation of the capability information field 525 will be presented because the reserved field 536 of the capability information field 525 is used for identifying an access router (AR) in the present invention.

Figure 6:
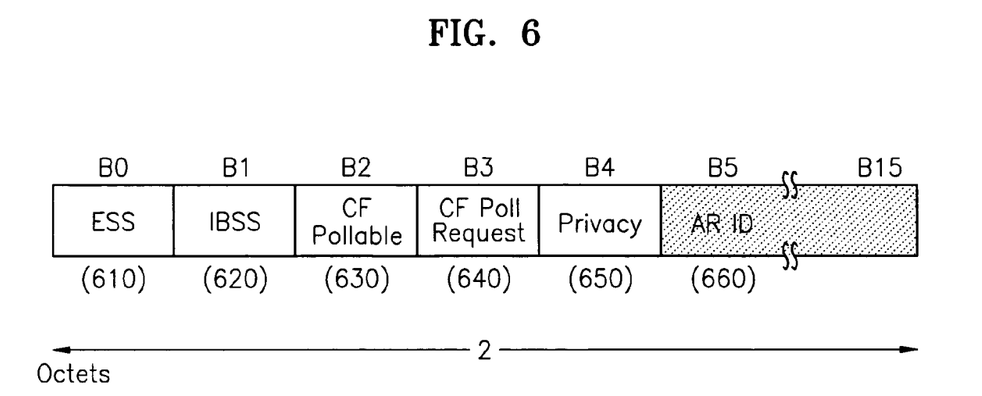
FIG. 6 is a diagram illustrating the structure of a capability information field according to an exemplary embodiment of the present invention.

FIG. 6 is a diagram illustrating the structure of a capability information field according to an exemplary embodiment of the present invention. Referring to FIG. 6, an ESS field 610, an IBSS field 620, a CF pollable field 630, a CF poll request field 640, a privacy field (Privacy) 650, and an AR identification (ID) field (AR ID) 660. The capability information field according to an exemplary embodiment of the present invention is the same as its conventional counterpart except for the AR ID field 660. In other words, in the present invention, the AR ID field 660 is inserted into a reserved field of a conventional information field so that requested access router information can be transmitted to a mobile node along with a beacon signal.

In addition, a beacon signal can be used in a conventional network system without any modifications made to the conventional network system because the beacon signal's compatibility with the conventional network system is guaranteed by the insertion of the requested access router information into a reserved field of a conventional MAC management frame, which has been determined as not being in use according to the IEEE standards for 802.11.

As described above, ID information of a predetermined access router is inserted into the AR ID field 660. Here, it is obvious to those skilled in the art that any type of ID information can be inserted into the AR ID field 660 as long as a desired access router in an ESS can be identified by the ID information.

Figure 7:
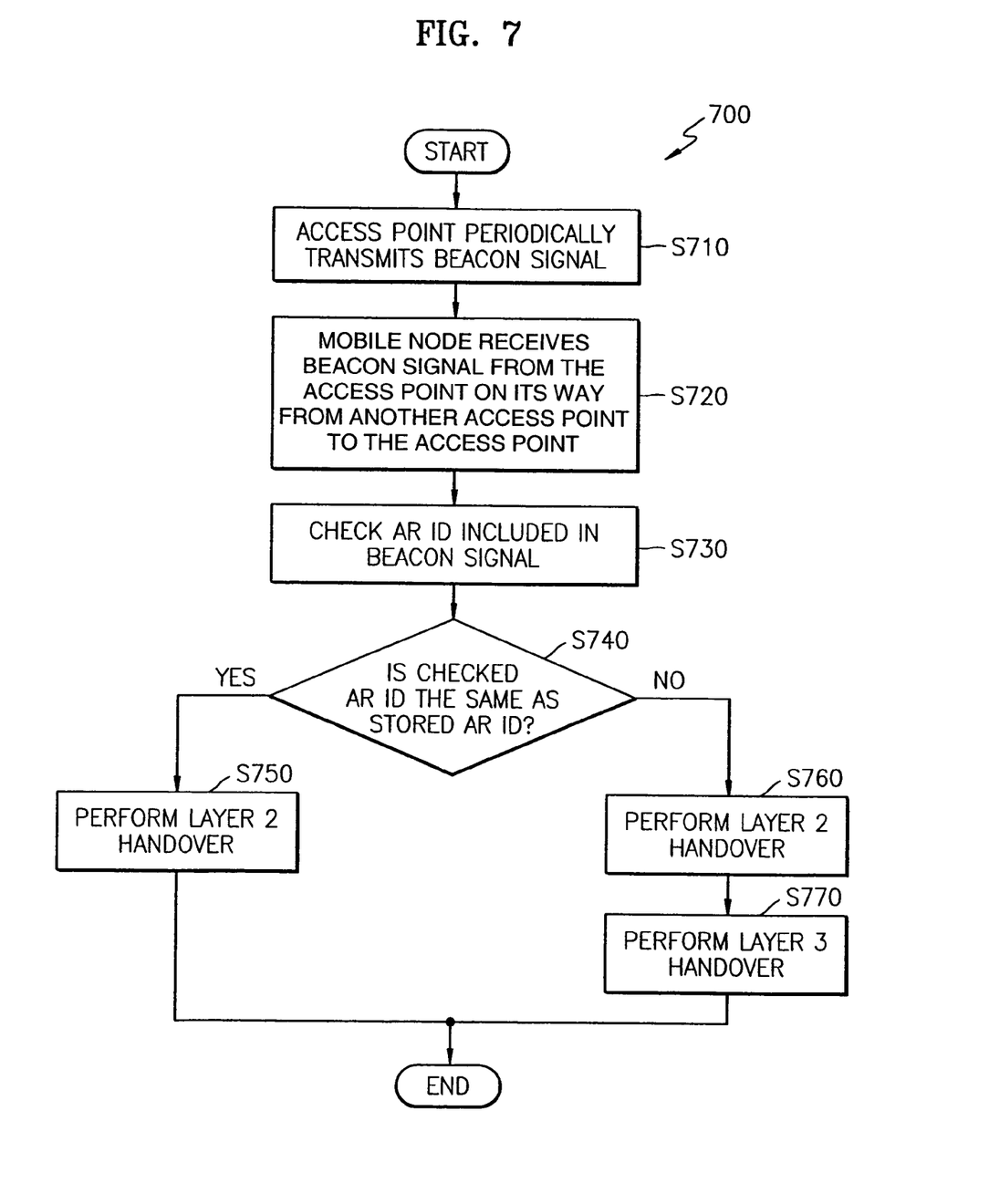
FIG. 7 is a flowchart of a handover method in a wireless local area network (WLAN) according to an exemplary embodiment of the present invention.

FIG. 7 is a flowchart 700 of a handover method in a 802.11 WLAN environment according to an exemplary embodiment of the present invention.

A mobile node moves in a 802.11 WLAN environment. An AR periodically transmits a beacon signal to the mobile node in step S710.

If the mobile node moves from one AP, ie., a previous AP, to another AP, i.e., a new AP, the mobile node receives a beacon signal from the new AP in step S720. In steps S730 and S740, the mobile node checks whether or not the new AP belongs to the same subnet that the previous AP belongs to by referring to AR ID contained in the beacon signal received from the new AP.

If the new AP is determined to belong to the same subnet that the previous AP belongs, the mobile node joins the new AP by carrying out layer 2 handover in step S750.

On the other hand, if the new AP is determined to belong to a different subnet than the previous AP, layer 2 handover is carried out when an L2 trigger occurs. Thereafter, in step S760, layer 3 handover is carried out.

Figure 8:
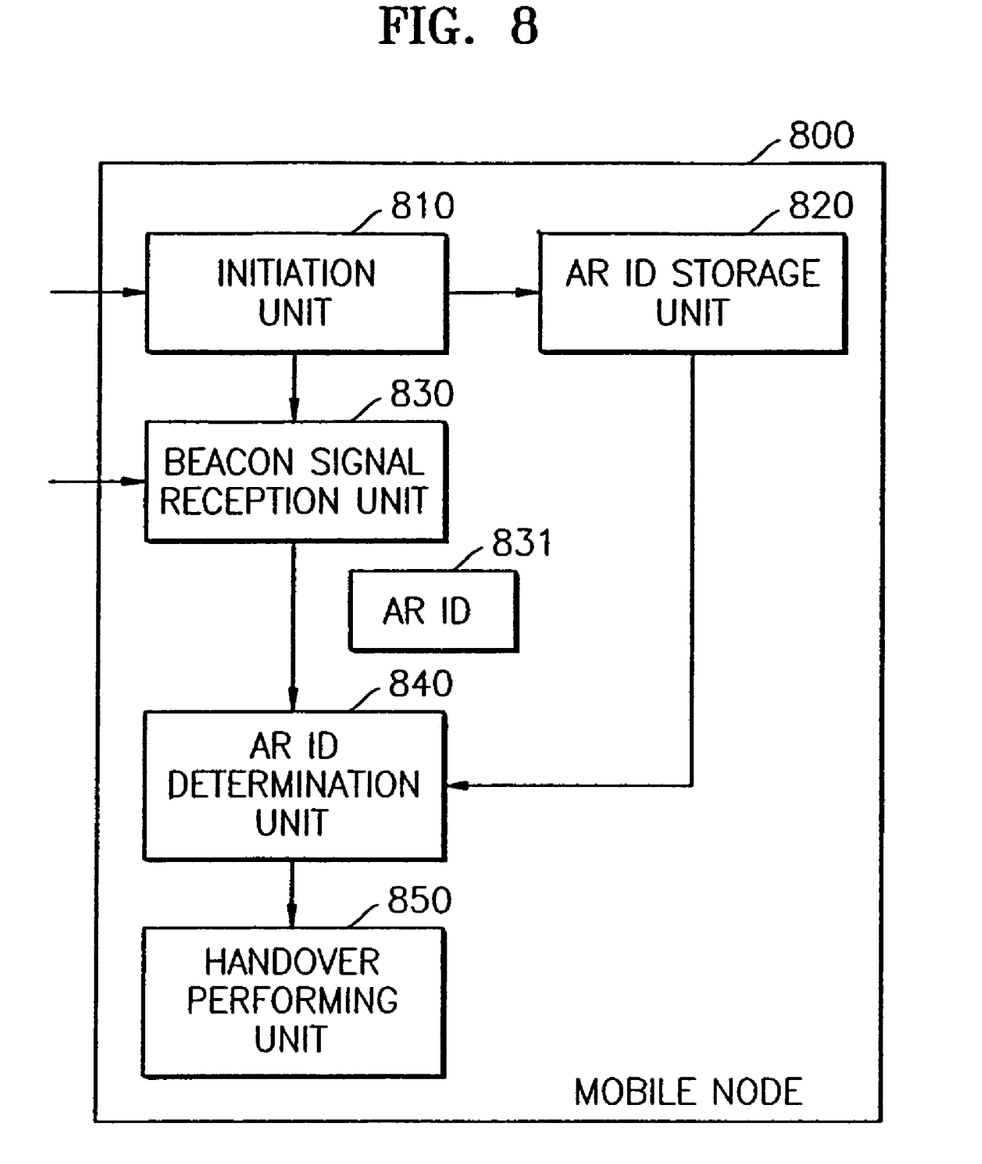
FIG. 8 is a block diagram of a mobile node device that carries out handover in a WLAN according to an exemplary embodiment of the present invention.

FIG. 8 is a block diagram of a mobile node device that carries out handover in a 802.11 WLAN environment according to an exemplary embodiment of the present invention. Referring to FIG. 8, a mobile node device 800 includes an initiation unit 810, an AR ID storage unit 820, a beacon signal reception unit 830, an AR ID determination unit 840, and a handover performing unit 850.

When a mobile node is initialized after being booted, the initiation unit 810 receives a beacon signal from an adjacent AP and stores a corresponding AR ID, inserted into the received beacon signal, into the AR ID storage unit 820.

When the mobile node begins to move, the beacon signal reception unit 830 receives a beacon signal from another AP, extracts a AR ID 831 from the received beacon signal, stores the AR ID 831 and transmits the extracted AR ID 831 to the AR ID determination unit 840.

The AR ID determination unit 840 determines whether or not the AR ID stored in the AR ID storage unit 820 is the same as the AR ID 831 received from the beacon signal reception unit 830 by comparing the previously stored AR ID with the extracted AR ID 831.

The handover performing unit 850 performs a handover in two different manners depending on a result of the determination provided by the AR ID determination unit 840. In other words, if the previously stored AR ID is the same as the extracted AR ID 831, the handover performing unit 850 only performs a layer 2 handover. Otherwise, the handover performing unit 850 also performs a layer 3 handover after performing the layer 2 handover.

The structure of a mobile node according to the present invention, which determines which kind of handover is to be carried out by referring to AR ID contained in a beacon signal, is not restricted to the one shown in FIG. 8. For example, the beacon signal reception unit 830 may possibly be included in the initialization unit 810, which is obvious to those skilled in the art.

As described above, according to the present invention, it is possible to reduce the number of messages transmitted between an AP and an AR in a WLAN environment where a plurality of APs exist in a subnet by adding a specific field into which a AR ID is inserted to a 802.11 MAC management frame.

In addition, it is possible to reduce layer 3 handover latency by carrying out the layer 3 handover using a AR ID contained in a beacon message received from a new AP when a mobile node moves between APs.

Moreover, the present invention is compatible with current WLAN environments since it takes advantage of a reserved field of a conventional MAC frame message.

What is claimed is:

1. A handover method in a wireless local area network (WLAN) environment, the handover method comprising:
   a) receiving a beacon signal containing access router identification information; and
   b) carrying out a handover based on the access router identification information contained in the beacon signal wherein said carrying out comprises a layer 2 handover if the access router identification information in the beacon signal is the same as a previous access router's access router identification information;
   wherein the router identification information is an Internet Protocol (IP) address.

2. The handover method of claim 1, wherein step b) comprises:
   b2) carrying out the layer 2 handover and a layer 3 handover if the access router identification information in the beacon signal is different from the previous access router's access router identification information.

3. The handover method of claim 1, wherein the access router identification information is included in a capability information field of the beacon signal.

4. The handover method of claim 1, wherein the access router identification information is included in a reserved field of the beacon signal.

5. A mobile node device that carries out handover in a WLAN environment, the mobile node device comprising:
   a beacon signal reception unit which receives a beacon signal containing access router identification information;
   a determination unit which compares the access router identification information contained in the beacon signal with a previous access router's access router identification information; and
   a handover performing unit which carries out a handover based on a result of the determination provided by the determination unit,
   wherein a layer 2 hand over is carried out if the access router identification information received in the beacon signal is the same as the previous access router's access router identification information;
   wherein the router identification information is an Internet Protocol (IP) address.

6. The mobile node device of claim 5, wherein if the result of the determination provided by the determination unit indicates that the access router identification information is the same as the previous access router's access router identification information, the handover performing unit carries out a layer 2 handover and otherwise, the handover performing unit carries out the layer 2 handover and a layer 3 handover.

7. The mobile node device of claim 5, wherein the access router identification information is included in a capability information field of the beacon signal.

8. The mobile node device of claim 5, wherein the access router identification information is included in a reserved field of the beacon signal.

* * * * *

UNITED STATES PATENT AND TRADEMARK OFFICE
CERTIFICATE OF CORRECTION

PATENT NO. : 7,599,330 B2  Page 1 of 1
APPLICATION NO. : 10/771508
DATED : October 6, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this

Twenty-eighth Day of September, 2010

David J. Kappos
*Director of the United States Patent and Trademark Office*